United States Patent Office 3,537,819
Patented Nov. 3, 1970

3,537,819
MANUFACTURE OF PHOSPHORYL FLUORIDE AND DIFLUOROPHOSPHORIC ACID
Robert A. Wiesboeck, Atlanta, Ga., assignor, by mesne assignments, to United States Steel Corporation, a corporation of Delaware
No Drawing. Continuation-in-part of applications Ser. No. 566,197, July 19, 1966, and Ser. No. 624,188, Mar. 20, 1967. This application Sept. 8, 1967, Ser. No. 666,518
The portion of the term of the patent subsequent to Feb. 25, 1986, has been disclaimed
Int. Cl. C01b 25/10
U.S. Cl. 23—203    4 Claims

ABSTRACT OF THE DISCLOSURE

An alkali or alkaline earth fluorosulfonate is mixed with a metal phosphate and the mixture heated to 150–350° C. to liberate phosphoryl fluoride and difluorophosphoric acid and the products recovered.

RELATED APPLICATIONS

This application is a continuation-in-part of my copending applications Ser. No. 566,197 now U.S. Pat. No. 3,429,659 and Ser. No. 624,188 now U.S. Pat. No. 3,428,421.

SUMMARY OF THE INVENTION

Conventional methods for the manufacture of phosphoryl fluoride are based on halogen transfer reactions of phosphoryl chloride with hydrogen fluoride or a fluoride salt. Another method consists of heating phosphorus pentoxide with calcium fluoride to 500–1000° C. Fluorophosphoric acids, on the other hand, are produced by reacting phosphorus pentoxide with hydrogen fluoride. All of the foregoing fluorophosphorus compounds are derived from phosphorus pentoxide which is accessible only through the electric furnace method.

I have discovered that phosphoryl fluoride and difluorophosphoric acid can be produced from phosphorus-containing salts, such as metal phosphates, in a simple, one-step operation. In the process, the metal phosphate is mixed with an alkali or alkaline earth fluorosulfonate and the mixture heated to 150–350° C., preferably 250° C., and from the evolved vapors phosphoryl fluoride and difluorophosphoric acid may be recovered.

DETAILED DESCRIPTION

By way of example, calcium fluorosulfonate reacts with a variety of phosphate salts and with phosphorus pentoxide to give volatile phosphorus-fluorine compounds. Typical phosphate sources are calcium, iron or aluminum phosphates or condensed species such as pyrophosphates or metaphosphates.

The volatile phosphorus-containing product consists of a mixture of phosphoryl fluoride and difluorophosphoric acid. The compounds can be separated and obtained in high purity.

The primary reaction product is phosphoryl fluoride formed according to

in the case of iron phosphate.

Difluorophosphoric acid represents the hydrolysis product of POF₃:

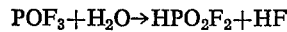

The degree of hydrolysis is dependent on the moisture and hydroxyl content of the phosphoric source. Pure tribasic phosphates or $P_2O_5$ produce phosphoryl fluoride only.

If metal equipment is employed, small amounts of phosphorus trifluoride are also formed due to a redox reaction between POF₃ and the metal.

Any alkali or alkaline earth fluorosulfonate may be employed. I prefer, however, to use calcium fluorosulfonate because it leaves a free-flowing reaction bed and results in the highest yields.

The metal phosphates include orthophosphates and condensed phosphates (polyphosphates). Specific examples are calcium, iron and aluminum orthophosphates and polyphosphates, including pyrophosphates and metaphosphates.

The heating of the reaction mixture can be carried out in a closed or open system allowing the gaseous products to accumulate or to expand into cold traps. Fractionation of the product is achieved by condensation into traps maintained at −20, −100 and −196° C., whereby difluorophosphoric acid, phosphoryl fluoride and phosphorus trifluoride are collected in that order.

The phosphoryl fluoride vapors and the difluorophosphoric acid vapors may be recovered as products by any suitable method, as, for example, by condensing the same in a suitable procedure. I prefer to fractionate the volatile reaction product by condensing the vapors in a series of traps or communicating chambers maintained at graduated temperatures in a series for first condensing difluorophosphoric acid at about −20° C. and then condensing phosphoryl fluoride at a tempearture of about −100° C. under vacuum. If phosphorus trifluoride is condensed, the trap may be maintained at about −196° C.

Specific examples illustrative of the process may be set out as follows:

EXAMPLE I

An intimate mixture of 20.6 g. of calcium fluorosulfonate and 8.8 g. of iron phosphate was prepared by grinding the reactants together in a mortar. The material was transferred to a 250-ml. Teflon reactor and heated to 250° C. Volatile material was allowed to expand into cold traps maintained at −20 and −100° C. After three hours, a stream of nitrogen was employed to sweep all products from the reactor into the traps. A total of 5.5 g. phosphoryl fluoride was obtained in the −100° C. trap.

EXAMPLE II

Aluminum phosphate (6.2 g.) and calcium fluorosulfonate (18.2 g.) were thoroughly mixed as described in Example I. On heating to 220° C. for four hours, 3.7 g. phosphoryl fluoride was obtained in the attached cold trap (−100° C.).

EXAMPLE III

Leached zone material (15.0 g., 19.3% $P_2O_5$), from phosphate mining operations and consisting of predominantly aluminum phosphate, was predried at 1000° C. and mixed with calcium fluorosulfonate (23.7 g.). Heating in a Teflon reactor to 220° C. for five hours produced difluoro-phosphoric acid (1.8 g.), phosphoryl fluoride (0.6 g.), and an undetermined amount of silicon tetrafluoride. The amount of volatile P-material collected corresponded to 59% of the total $P_2O_5$ content in the leached zone material.

EXAMPLE IV

Calcium metaphosphate (39.5 g.) and calcium fluorosulfonate (143.0 g.) were intimately mixed and placed in a 1-liter stainless steel autoclave. On heating to 250–280° C. over a 3-hour period, a pressure of 215 p.s.i. developed. The gas was allowed to expand into a fractionation train while the autoclave was still hot. After pumping to 1-2 mm. total pressure, 5.6 g. of difluorophosphoric acid, 26.1 g. of phosphoryl fluoride and 1.6 g. of phosphorus trifluoride had accumulated in the −20, −100 and −196° C. traps, respectively.

EXAMPLE V

A mixture of calcium pyrophosphate (15.6 g.) and calcium fluorosulfonate (44.0 g.) was prepared as described in Example I. The reactants were placed into a stainless steel reactor and heated to 200° C. for two hours. The temperature was subsequently increased to 300° C. for one hour while volatile material was allowed to expand into attached traps maintained at −20, −100 and −196° C. All volatile material was swept into the cold traps by a stream of dry nitrogen. A total of 10.2 g. phosphoryl fluoride was collected from the −100° C. trap. Only a trace of difluorophosphoric acid was formed.

EXAMPLE VI

The process may be carried out as described in the preceding examples substituting sodium fluorosulfonate or potassium fluorosulfonate for calcium fluorosulfonate to obtain substantial yields of phosphoryl fluoride and difluorophosphoric acid.

While in the foregoing specification I have set out specific procedure in considerable detail for the purpose of illustrating embodiments of the invention, it will be understood that such details or procedure may be varied widely by those skilled in the art without departing from the spirit of my invention.

I claim:

1. In a process for the preparation of phosphoryl fluoride, the steps of heating a mixture of a fluorosulfonate salt selected from the group consisting of an alkali fluorosulfonate and an alkaline earth fluorosulfonate, with a phosphate selected from the group consisting of calcium, iron and aluminum phosphates at a temperature of about 150–350° C. to evolve prosphoryl fluoride vapors.

2. The process of claim 1 in which said phosphoryl fluoride vapors are chilled under vacuum to about −100° C. to condense the vapors.

3. The process of claim 1 in which the fluorosulfonate salt is calcium fluorosulfonate.

4. The process of claim 1 in which the temperature is at about 250° C.

References Cited

UNITED STATES PATENTS 3,428,421   2/1969   Wiesboeck _____ 23—139
3,429,659   2/1969   Wiesboeck _____ 23—139

EARL C. THOMAS, Primary Examiner

U.S. Cl. X.R.

23—139